(12) United States Patent
Blinnikka

(10) Patent No.: US 8,892,608 B2
(45) Date of Patent: Nov. 18, 2014

(54) HIGHLY RELIABLE CROSS-SESSION WEB APPLICATION INSTRUMENTATION

(75) Inventor: Tomi J. Blinnikka, San Pablo, CA (US)

(73) Assignee: Apollo Education Group, Inc., Phoenix, AZ (US)

(*) Notice: Subject to any disclaimer, the term of this patent is extended or adjusted under 35 U.S.C. 154(b) by 26 days.

(21) Appl. No.: 12/848,042

(22) Filed: Jul. 30, 2010

(65) Prior Publication Data

US 2012/0030248 A1 Feb. 2, 2012

(51) Int. Cl.
*G06F 17/30* (2006.01)
(52) U.S. Cl.
CPC .................. *G06F 17/30902* (2013.01)
USPC ........................................................ 707/803
(58) Field of Classification Search
CPC .................................................. G06F 17/30902
See application file for complete search history.

(56) References Cited

U.S. PATENT DOCUMENTS

| | | | |
|---|---|---|---|
| 2002/0198976 A1* | 12/2002 | Davenport | 709/223 |
| 2004/0258053 A1 | 12/2004 | Toporek et al. | |
| 2006/0021016 A1* | 1/2006 | Birk et al. | 726/10 |
| 2007/0171921 A1 | 7/2007 | Wookey et al. | |
| 2007/0282951 A1 | 12/2007 | Selimis et al. | |
| 2008/0228772 A1* | 9/2008 | Plamondon | 707/10 |
| 2009/0271514 A1* | 10/2009 | Thomas et al. | 709/224 |

OTHER PUBLICATIONS

Notification of the Transmittal of the International Search Report and the Written Opinion of the International Searching Authority for International Application No. PCT/US11/43859 mailed Nov. 17, 2011, from the U.S. International Searching Authority, 7 pages, Alexandria, Virginia USA.
Current Claims as of Nov. 17, 2011 of International Application No. PCT/US11/43859, 4 pages.
Mexican Institute of Industrial Property Patent Branch, Office Action in application No. MX/a/2013/001159, dated Apr. 23, 2014, 4 pages.
Current Claims in Mexico application No. MX/a/2013/001159, dated Apr. 2013, 4 pages.
Current Claims in Canadian Application No. 2,806,179, dated Jun. 2014, 4 pages.
Canadian Intellectual Property Office, Office Action in application No. 2,806,179, dated Jun. 10, 2014, 4 pages.

* cited by examiner

*Primary Examiner* — Khanh Pham
*Assistant Examiner* — Johnese Johnson
(74) *Attorney, Agent, or Firm* — Hickman Palermo Troung Becker Bingham Wong LLP

(57) ABSTRACT

A reliable caching mechanism is provided for client-side caching of data that captures user interaction with a remote service, where users interact with the remote service through a computing device. Such instrumentation items are cached in a client-side offline queue. Within the client-side queue, the gathered instrumentation items survive between user sessions with the remote service. Because the client-side does not lose the instrumentation items that were gathered in a session when the session ends, those instrumentation items do not all need to be transferred to the server-side at or prior to the termination of the session in which the instrumentation items are collected. Instead, the instrumentation items may be sent to the server-side at times that will have less impact on the user experience, such as when the computing device is otherwise idle.

28 Claims, 3 Drawing Sheets

HIGHLY RELIABLE CROSS-SESSION WEB APPLICATION INSTRUMENTATION

FIELD OF THE INVENTION

The present invention relates to managing the collection of user tracking data representing user interactions with web content at a client device. More specifically, the present invention relates to locally caching user tracking data at the client device and selectively transmitting the cached data.

BACKGROUND

Increasingly, people are obtaining services of one form or another over networks. For example, users of client devices may obtain news, television, weather information, and even a college education over a network from remotely-located computer services. Such client devices may take many forms, including but not limited to cell phones, personal digital assistants, laptops and desktop computers.

For a variety of reasons, it is useful to know how users are interacting with such remotely-provided services. For example, a service provider may find it useful to know that users frequently hover their input focus (such as a mouse pointer) over a certain portion of the display, or that users rarely use certain controls provided by the services. Service providers may collect data reflecting user interactions with remotely-provided services for the additional purposes of user personalization of the services, user profiling, system usage metrics, and other research purposes.

Remotely-provided services typically involve both client-side logic and server-side logic. The client-side logic of a service is typically responsible for generating a user interface through which a user may interact with the service. The server-side logic of a service is typically responsible for the content of the service, and for providing that content to the client.

Obtaining information about how users interact with services that are accessed using computing devices is referred to as "user tracking". The modifications that are made to perform user tracking are referred to as "instrumentation". Today most user tracking and web application instrumentation is performed either using cookies or by sending information about user actions and application performance immediately from the client-side to the server-side using "beacons". These mechanisms are highly restrictive and limit the amount of information that can be collected on the client-side in a reliable manner and without unduly degrading the user experience.

For example, the information captured by cookies and beacons is typically limited to the user's "clickstream". A clickstream indicates the controls, within the HTML pages provided by a service, on which the user has "clicked". However, a user's clickstream conveys only part of the user's interaction with a web service. For example, a clickstream may not indicate when and where users move their input focus while interacting with the service. As another example, a clickstream may not be able to indicate how a user made a particular selection. For example, some web pages may provide a number of alternative input mechanisms (e.g. a clickable button, menu option, and a keyboard shortcut) to accomplish the same operation (e.g. saving a document in the application). The clickstream may indicate that the user selected the operation, but not which of the input mechanisms was used to initiate the operation. As another example, a clickstream may not indicate user interactions that are handled by client-side code, such as JAVASCRIPT™ or FLASH®, that is embedded in a web page delivered to clients by the service. It may be just as important to know how a user interacts with the interfaces generated by client-side code as it is to know a user's clickstream.

Unfortunately, capturing more than a clickstream presents several technical challenges. For example, the communication bandwidth from the client-side logic to the server-side logic (the "upstream bandwidth") is often significantly lower than the communication bandwidth from the server-side logic to the client-side logic (the "downstream bandwidth"). Consequently, sending to the server-side detailed information about what a user is doing on the client-side may consume an unacceptably large amount of the relatively small upstream bandwidth.

In addition, Web application development has changed and more of the logic and user interface is now created or fully controlled on the client computer. Previously, the server would create the user interface elements and/or get a request for most, if not all, user actions via a post back (page reload). User tracking in these instances is accomplished by monitoring the user's clickstream generated by the user requests to the server as the user navigates the available resources. As "Web 2.0" technologies have proliferated, these mechanisms to track user actions are no longer sufficient to capture the variety of ways users interact with "Web 2.0" interfaces. Current solutions attempt to either immediately send all instrumentation data at the time it is gathered, or to queue information about a user's interaction with a page and then flush the queue by sending the information to the server-side when the page unloads. Unfortunately, sending the contents of a client-side queue to the server-side in response to the unloading of a page is not reliable, nor does it provide a good user experience when it is possible. Additionally, because current solutions keep user tracking data in volatile memory, the failed transmission of client-side queue data could result in the permanent loss of valuable user tracking data after a session is ended.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
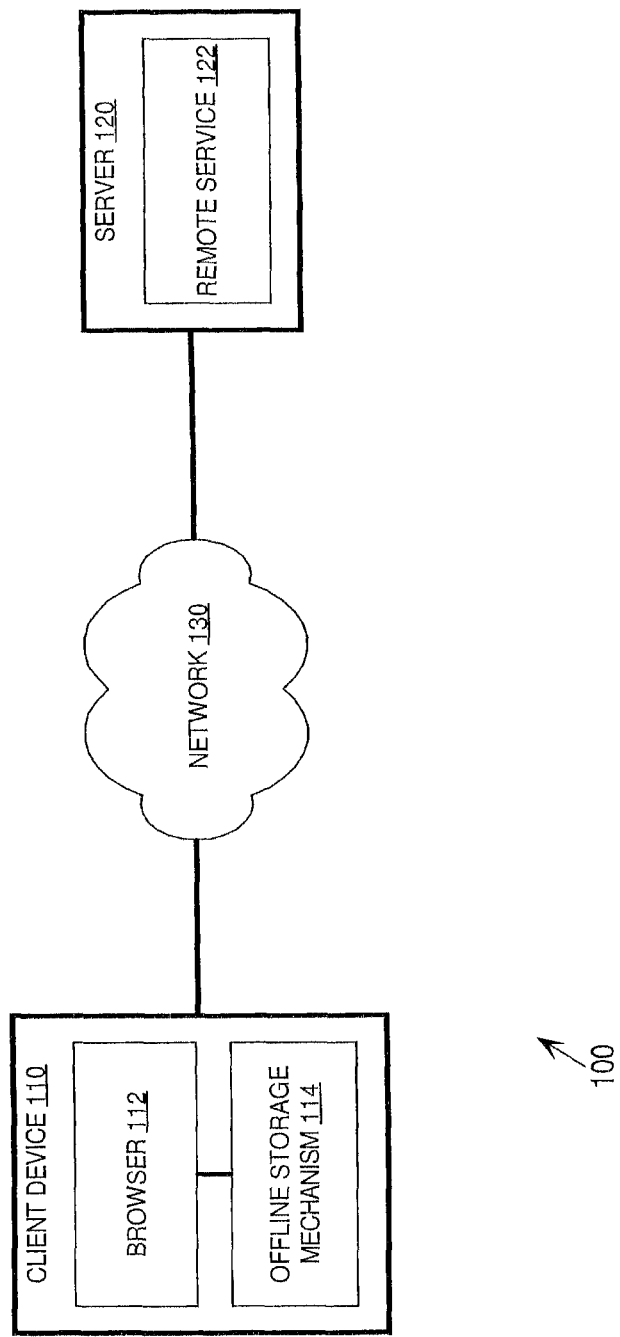
FIG. 1 is a block diagram that depicts an example network arrangement 100 for collecting user tracking data from user interactions with a web application.

In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

General Overview

A reliable caching mechanism is provided for client-side caching of data that captures user interaction with a remote service, where users interact with the remote service through a computing device. According to one embodiment, such data (referred to herein as "instrumentation items") are cached in a client-side offline queue. Within the client-side queue, the gathered instrumentation items survive between user sessions with the remote service. Because the client-side does not lose the instrumentation items that were gathered in a session when the session ends, those instrumentation items do not all need to be transferred to the server-side at or prior to the termination of the session in which the instrumentation items are collected. Instead, the instrumentation items may be sent to the server-side at times that will have less impact on the user experience, such as when the computing device is otherwise idle. Using these techniques, more information may be gathered and sent to the server-side without significantly interfering with the user experience.

Using a client-side cache in this manner allows a service to gather more data about the user's actions than would otherwise be feasible to instrument without interfering with the user experience or application performance. Being able to reliably save the instrumentation items on the client-side without having to immediately send them to the server-side data collection services allows a service to dynamically strike the right balance between the user experience, the amount of data gathered, and timeliness of reporting that data to the server-side.

Specifically, in one embodiment, client-side caching allows "data throttling" for situations where it may be temporarily inconvenient or unfeasible to send (all) of the instrumentation items to the server-side. Situations in which instrumentation item transmission may be postponed include when a user is experiencing a degraded connection speed or where there in an unusually high load on the capturing service.

Client-Side Instrumentation Code

According to one embodiment, client-side computer code is provided that can listen to or be given items of interest for instrumentation purposes. In one embodiment, the code is implemented as a class (referred to herein as the "instrumentation class") in an object-oriented language. It should be noted that use of an instrumentation class is merely one way in which client-side caching may be implemented, and the techniques described herein are not limited to an implementation that uses an instrumentation class. For example, the techniques may be implemented using client-side routines that are spread over several different classes, or even by routines that are written in a programming language that is not object-oriented.

According to an embodiment that uses an instrumentation class, the instrumentation class defines methods for storing the captured items in a client-side offline storage mechanism, such as HTML 5 Web Storage, an Adobe Flash application's SharedObject, Microsoft Silverlight, or other client-side technology such as Google Gears. These are merely examples of client-side offline storage mechanisms that may be used, and the techniques described herein are not limited to any particular offline storage mechanism.

A number of options are available for delivering the code implementing the instrumentation class to the user's client. According to one embodiment, the client-side code is provided integrally as a component of the web application content delivered to the user when the user requests use of the remote service. The instrumentation class code may be embedded directly in the web application content, or imported into the application content as a separately delivered library component. According to another embodiment, the client-side instrumentation code may be integrated into a web browser as an add-on or toolbar, or delivered as a standalone client-side application.

After the client has received and instantiated the code implementing the instrumentation class, user events are delivered to the instrumentation class for processing. According to one embodiment, the instrumentation items may be sent to the instrumentation class by event handlers in the application code that monitor user interactions with the application interface. For example, when a user selects a button, the code that implements the button may invoke a method of the instrumentation class, and pass to the method parameter values that indicate the user's interaction with the button. The parameters may convey a variety of information about the user's interaction, such as which button was selected, when the button was selected, and the specific operation that was initiated by the user's selection of the button.

According to another embodiment, the instrumentation class may itself listen for user actions and record those actions as instrumentation item data. For example, the user interactions detected by the client application code may first be sent to a user event bus. The instrumentation class would listen to the user event bus to detect new instrumentation items that ready for input into the client-side offline storage mechanism. In such an embodiment, the event bus would provide a common point of entry for detected user interactions across the web application. According to another embodiment, other client-side code external to the remote application may monitor user interactions and deliver them to the instrumentation class through an appropriate interface.

Controlling Client-Side Cache Operation

According to one embodiment, different values may be passed as parameters to the methods provided by the instrumentation class to affect how the instrumentation items are cached at the client-side, and when cached instrumentation items are sent to the server-side. The parameters whose values affect the operation of the client-side cache are referred to herein as "control parameters". Because the rules by which the client-side cache operates are affected by the values passed to the control parameters, those rules are referred to herein as "parameterized rules". According to one embodiment, based on parameterized rules, the processes that are instantiated based on the instrumentation class determine the optimal amount of data to cache in relation to (a) the current application state and (b) user activity before sending the instrumentation items to a capturing service over the network.

Variables

In one embodiment, the values passed to control parameters affect variables which in turn affect operation of the client-side cache. For example, in one embodiment the variables that can be adjusted based on the values of the control parameters provided to the instrumentation class: time elapsed, critical time periods, number of events, data size, user idle time, amount of network traffic, etc. These variables are merely examples of the types of variables that can be used by the implementation class to affect how the client-side cache operates. The types and value of these variables may be established on an application-wide basis, or the developers of individual application components within the service may provide variables based on the specific requirements of each application component.

According to one embodiment, the control parameters may be used to assign varying degrees of priority to the variables that affect the operation of the client-side cache. In such an embodiment, instrumentation items stored in the offline storage mechanism may be ordered in a transmission queue based at least partially on the relative priorities of the variables. According to this embodiment, stored instrumentation items may be transmitted to the server-side in a different order than the order in which the user events occurred at the client.

For example, assume that "time elapsed" is assigned a high priority value, while "data size" is assigned a low priority value. Under these circumstances, the client-side cache may send an older large instrumentation item to the server-side before sending a more recent small instrumentation item. Conversely, if "time elapsed" is assigned a low priority value, and "data size" is assigned a high priority value, then the client-side cache may send the newer small instrumentation item before the larger old instrumentation item.

Variable Thresholds

According to an embodiment, the variables that affect operation of the client-side cache may have one or more thresholds. For example, a threshold may be established for "network connection speed". If the user's detected network connection speed is above the threshold, the amount of time that instrumentation items are cached in the offline storage mechanism may be reduced. Conversely, if the user's detected network connection speed is below the threshold, the amount of time that instrumentation items are cached in the offline storage mechanism may be increased. There may be any number of thresholds for any given variable. Thus, a second, lower threshold may be established for the network connection speed, where instrumentation items are not sent to the server-side at all if the user's detected speed falls below the second threshold.

According to one embodiment, the thresholds associated with a variable may be dynamically tuned according to changing network, client-side, server-side, or other application conditions. The thresholds for a variable may be set initially when the user starts a new session, and may also be set or adjusted during a user's session in response to detecting a change in some condition.

According to one embodiment, a rule may establish that specific instrumentation items should be treated as "critical", where critical instrumentation items are sent to the server-side immediately, optionally bypassing the cache. Even if the session is terminated (page is unloaded) before all data has been sent successfully, the data is persisted on the client-side, and can be sent the next time the user visits the website or application.

Tokenized Instrumentation Items

According to one embodiment, the negative impact the transmission of instrumentation items has on performance is further reduced by tokenizing the instrumentation items prior to sending the instrumentation items from the client-side to the server-side. For example, instrumentation items can be "tokenized" by creating a mapping of large and/or repetitive portions of instrumentation items. These mappings may be session-specific, or the same mapping may be used across sessions.

For example, in one embodiment, the instrumentation class sends out a single mapping item that the backend can utilize to expand the full portion of data for each received item. Thus, if the URL of the page with which a user interacted is part of the data to be reported with each instrumentation item, the entire URL of the page can be sent once, along with a mapping to a short token or ID (such as a number or MD5 hash). In all subsequent instrumentation items that are generated based on interactions with that same page, the URL may be replaced with the shorter ID.

According to one embodiment, instrumentation items are tokenized according to a known token mapping at the time they are selected from the offline storage mechanism and transmitted to the server-side. The mapping may include tokens that have been created for the current session or include token mappings generated in a previous session. According to another embodiment, the instrumentation class may continuously or periodically scan the offline storage mechanism in order to detect repetitive portions of the instrumentation item data in order to create new token mappings. Instrumentation items may then be tokenized in the offline storage mechanism prior to transmission, reducing the space needed to store the instrumentation item data.

Cross-Session Management of Instrumentation Data

In order to collect instrumentation item data that was not transmitted to the server-side during the user session in which the data was generated, instrumentation items are stored in the client-side cache and have the ability to persist across user sessions. For example, a user session may end when the user logs out of a remote application or unloads the pages containing the remote application before all data currently in the cache has been transmitted. According to one embodiment, instrumentation items stored in the client-side cache may be coded according to a data schema that includes a session identification attribute in order to distinguish instrumentation item data across multiple sessions. Other example instrumentation item schema attributes may include a user ID, trace level, source, element, command, and timestamps.

According to one embodiment, instrumentation items from a prior session may be detected in the cache when a user starts a new session and the items may be delivered as part of the new session's startup sequence. For example, instrumentation items from prior sessions may be detected in the cache by comparing session IDs or timestamp attributes. According to another embodiment, instrumentation items detected from prior sessions may simply be added to the transmission queue for the current session and selected for transmission accordingly.

The client-side code may store and retrieve instrumentation items from the offline storage mechanism using any available programmatic interface for such purposes depending on the particular cache implementation. Instrumentation items retrieved from the cache may be transmitted to the server-side using a number of communication protocols including, but not limited to, HTTP, HTML 5 sockets, or TCP/IP connection. The instrumentation item data may be transmitted to the receiving service as individual items or as a batched data object including multiple items.

According to one embodiment, transmitted instrumentation items from the client-side cache may remain in the transmission queue until the client receives some confirmation of delivery from the server-side. For example, in one embodiment, transmitted instrumentation items may remain in the transmission queue until an HTTP 200 response, or any other similar delivery confirmation message depending on the protocol, is received from the server-side. According to another embodiment, a transmission retry mechanism may be implemented in order to attempt re-transmitting items for which no delivery confirmation message was received or were otherwise unsuccessfully transmitted to the server-side.

Example Operation

FIG. 1 is a block diagram that depicts an example network arrangement 100 for collecting user tracking data from user interactions with a web application. Referring to FIG. 1, a user at client device 110 opens up a web browser 112 and makes a request to server 120 for use of remote service 122. In this example, the server 120 sends back to the client device 110 web application data providing the user the ability to interact with remote service 122. In one embodiment, the web application data will include code to be executed on the client device 110 for the purposes of tracking the user's interaction with the received web application.

Figure 2:
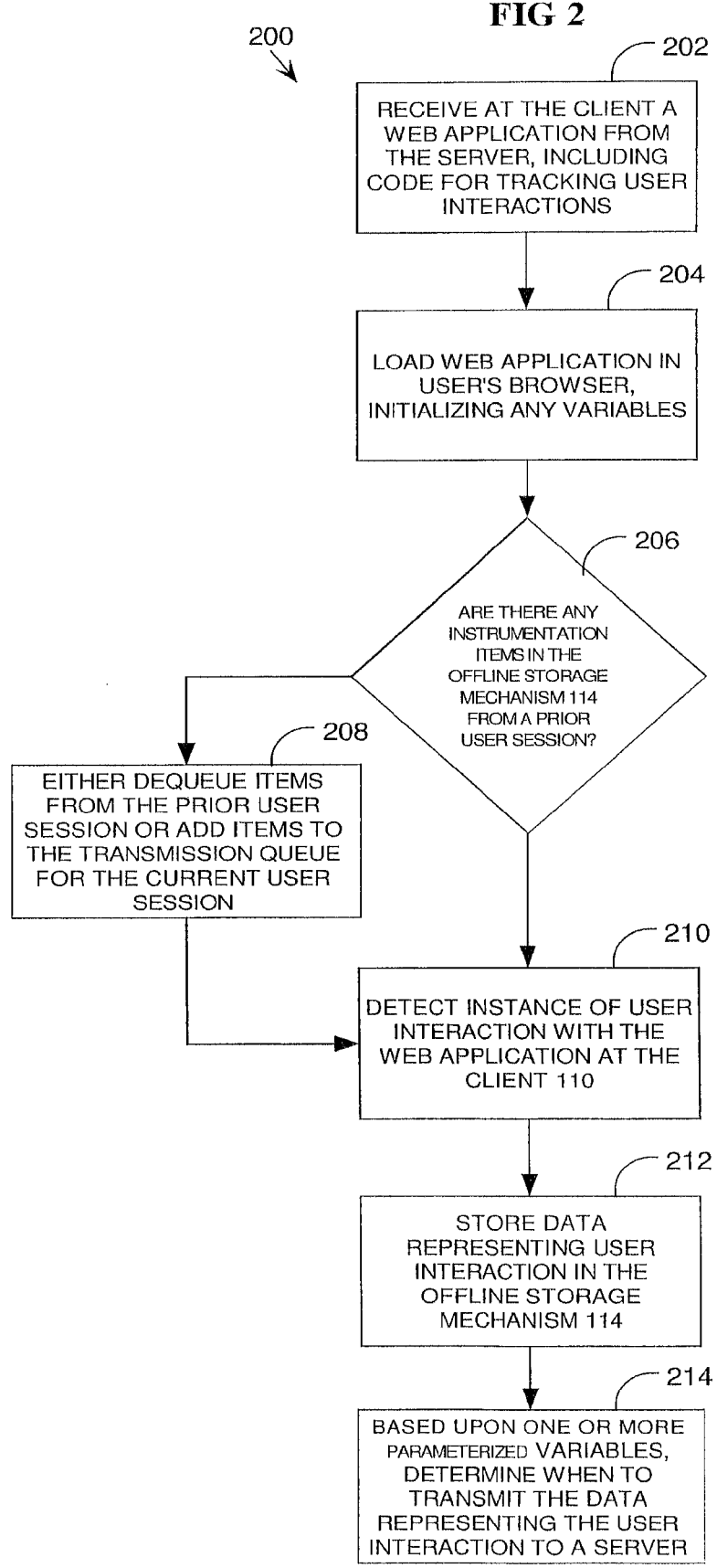
FIG. 2 is a flowchart illustrating steps for collecting user tracking data, in accordance with an embodiment of the invention.

A user may begin a new session with the web application when the application has loaded in the browser 112 on the client's device 110, or alternatively when the user logs into the web application. FIG. 2 is a flowchart that represents the lifecycle 200 of the web application on the client's device 110 after the client-side logic for the web application has been received by the client device 110.

Referring to FIG. 2, at step 202, the client device 110 receives a web application from a web server, where the web application includes code for tracking user interactions. The web application may take many forms, including but not limited to code that is embedded in or that accompanies a web page that has been retrieved from the client. At step 204, the web application is instantiated on the client's device 110 and supplies parameters for one or more program variables.

According to one embodiment, at step 206, the application checks the offline storage mechanism 114 for any user tracking data in the cache that may not have been transmitted to a server in a prior user session. Based on a determination at step 206 that user tracking data from a prior session exists in the storage, according to one embodiment in step 208, the application may either transmit the user tracking data to a server as part of the application's start-up sequence, or add the user tracking data to a transmission queue instantiated for the current session for later transmission.

Once the application has finished any other start-up routines, the application begins tracking current user interactions with the web application at step 110. In one embodiment, notifications of user actions with the web application are sent to the application for processing. At step 212, the application stores data representing the user interactions in the offline storage mechanism 114 on the client device 110.

According to one embodiment, the user interaction data remains in the offline storage mechanism 114 until, at step 214, the application detects some condition based upon one or more of the program variables triggering the application to send one or more of the user interaction data items to a server. The application may continue operating in this fashion until the user unloads the application on the client by closing the pages containing the application or otherwise halting execution of the code.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
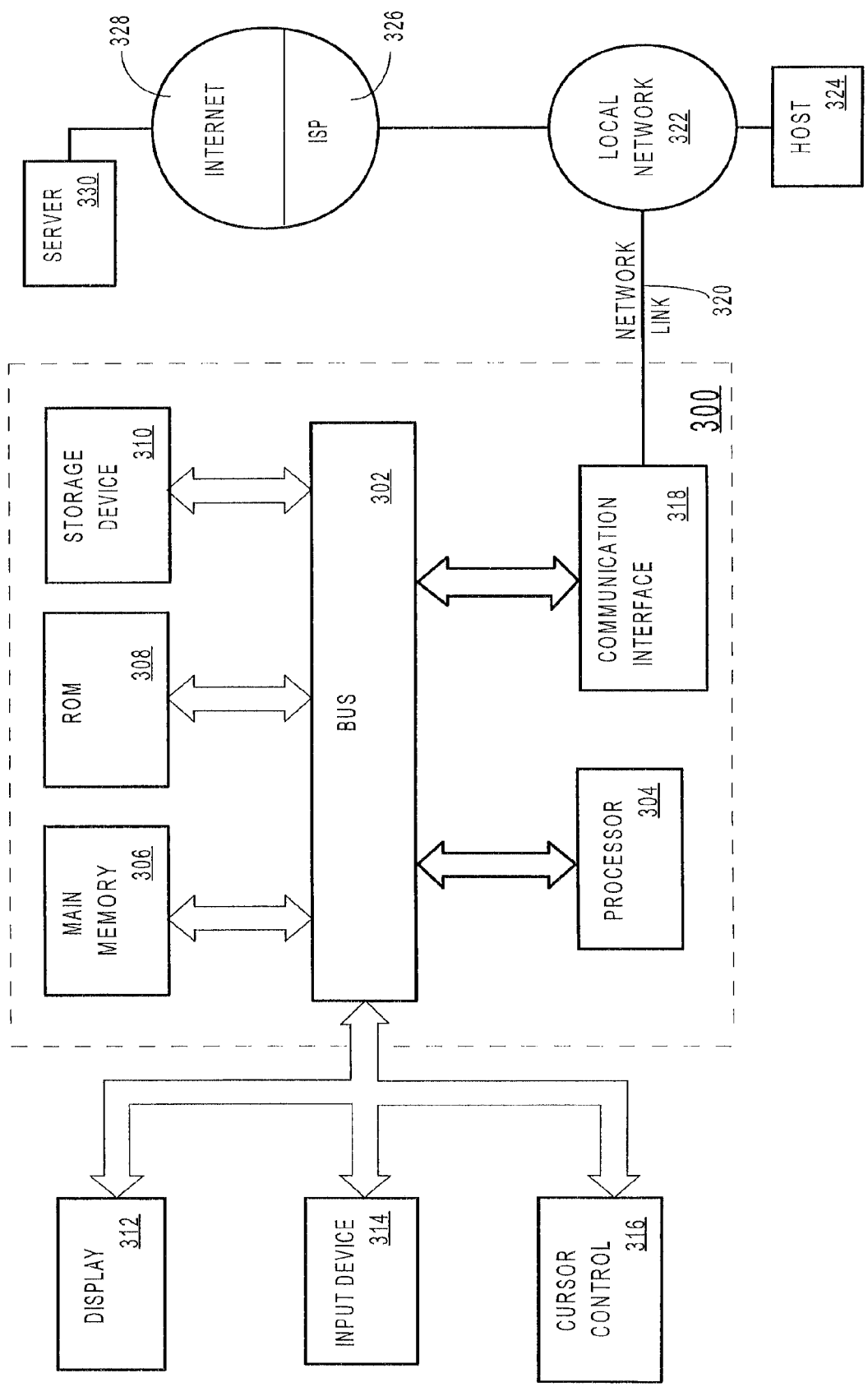
FIG. 3 is a block diagram of a computer system on which embodiments of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for collecting user instrumentation data, the method comprising the steps of:
    during a first online session between a remote service and a client, detecting an interaction by a user with an interface that is displayed on the client, wherein the interface is an interface of a web application associated with the remote service;
    wherein the remote service is hosted at a server that is remote relative to the client;
    in response to detecting said user interaction, storing an instrumentation item, comprising information about said user interaction with the interface displayed on the client during the first online session, in a client-side offline storage mechanism;
    determining that the instrumentation item is to be sent in a subsequent online session, rather than sent during or at the end of the first online session;
    in response to determining that the instrumentation item is to be sent in a subsequent online session, retaining the instrumentation item in the client-side offline storage mechanism after the first online session has terminated due to either (a) the user logging out of the web application, or (b) the user unloading one or more pages containing the web application; and
    during a second online session between the remote service and the client, transmitting said instrumentation item from said client-side offline storage mechanism to a server-side collection service;
    wherein the method is performed by one or more computing devices.

2. The method of claim 1 wherein the step of storing the instrumentation item is performed by client-side logic that is sent to the client from the server that hosts the remote service.

3. The method of claim 1, further comprising, before performing the step of transmitting:
    receiving parameter values provided by said web application for one or more application variables; and determining when to transmit said instrumentation item to said server-side collection service based, at least in part, on the one or more application variables.

4. The method of claim 1, wherein storing the instrumentation item includes placing said instrumentation item in a transmission queue for transmission to said server-side collection service.

5. The method of claim 4, further comprising:
ordering said instrumentation item in the transmission queue relative to other instrumentation items in the transmission queue based at least partially upon one or more variables, wherein values for said one or more variables are provided by the web application;
transmitting instrumentation items of the transmission queue to said server-side collection service based on the order in which the instrumentation items are stored in the transmission queue.

6. The method of claim 5, wherein the one or more variables include a particular variable that represents at least one of: user idle time, time elapsed in the client-side offline storage mechanism, network connection speed, number of instrumentation items in the client-side offline storage mechanism, or data size of client-side offline storage mechanism.

7. The method of claim 5, further comprising:
associating one or more specified thresholds with said one or more variables; and
using said one or more specified thresholds to determine when to transmit said instrumentation item to said server-side collection service.

8. The method of claim 7, further comprising:
detecting that some application or network condition has changed; and
in response to detecting that some application or network condition has changed, adjusting one or more of said one or more specified thresholds.

9. The method of claim 1, further comprising:
creating a token mapping for one or more portions of one or more instrumentation items stored in said client-side offline storage mechanism;
transmitting an item representing said created token mapping to said server-side collection service; and
tokenizing one or more other instrumentation items in said client-side offline storage mechanism based on the token mapping.

10. The method of claim 1, the step of transmitting further comprising:
detecting a delivery confirmation message from said server-side collection service indicating receipt of said instrumentation item; and
based upon detecting said delivery confirmation message, removing said instrumentation item from said client-side offline storage mechanism.

11. The method of claim 1, further comprising:
detecting that a delivery confirmation message from said server-side collection service indicating receipt of said instrumentation item has not been received after a specified period of time;
based upon detecting that said delivery confirmation message has not been received after a specified period of time, retransmitting said instrumentation item to said server-side collection service.

12. The method of claim 1, wherein said client-side offline storage mechanism is a persistent component of a web browser.

13. One or more non-transitory computer readable media storing instructions which, when executed by one or more processors, cause performance of the steps of:

during a first online session between a remote service and a client, detecting an interaction by a user with an interface that is displayed on the client, wherein the interface is an interface of a web application associated with the remote service;
wherein the remote service is hosted at a server that is remote relative to the client;
in response to detecting said user interaction, storing an instrumentation item, comprising information about said user interaction with the interface displayed on the client during the first online session, in a client-side offline storage mechanism;
determining that the instrumentation item is to be sent in a subsequent online session, rather than sent during or at the end of the first online session;
in response to determining that the instrumentation item is to be sent in a subsequent online session, retaining the instrumentation item in the client-side offline storage mechanism after the first online session has terminated due to either (a) the user logging out of the web application, or (b) the user unloading one or more pages containing the web application; and
during a second online session between the remote service and the client, transmitting said instrumentation item from said client-side offline storage mechanism to a server-side collection service.

14. The one or more non-transitory computer readable media of claim 13 wherein the step of storing the instrumentation item is performed by client-side logic that is sent to the client from the server that hosts the remote service.

15. The one or more non-transitory computer readable media of claim 13, further comprising instructions for:
before performing the step of transmitting:
receiving parameter values provided by said web application for one or more application variables; and
determining when to transmit said instrumentation item to said server-side collection service based, at least in part, on the one or more application variables.

16. The one or more non-transitory computer readable media of claim 13, wherein storing the instrumentation item includes placing said instrumentation item in a transmission queue for transmission to said server-side collection service.

17. The one or more non-transitory computer readable media of claim 16, further comprising instructions for:
ordering said instrumentation item in the transmission queue relative to other instrumentation items in the transmission queue based at least partially upon one or more variables, wherein values for said one or more variables are provided by the web application;
transmitting instrumentation items of the transmission queue to said server-side collection service based on the order in which the instrumentation items are stored in the transmission queue.

18. The one or more non-transitory computer readable media of claim 17, wherein the one or more variables include a particular variable that represents at least one of:
user idle time, time elapsed in the client-side offline storage mechanism, network connection speed, number of instrumentation items in the client-side offline storage mechanism, or data size of client-side offline storage mechanism.

19. The one or more non-transitory computer readable media of claim 17, further comprising instructions for:
associating one or more specified thresholds with said one or more variables; and
using said one or more specified thresholds to determine when to transmit said instrumentation item to said server-side collection service.

20. The one or more non-transitory computer readable media of claim 19, further comprising instructions for:
- detecting that some application or network condition has changed; and
- in response to detecting that some application or network condition has changed, adjusting one or more of said one or more specified thresholds.

21. The one or more non-transitory computer readable media of claim 13, further comprising instructions for:
- creating a token mapping for one or more portions of one or more instrumentation items stored in said client-side offline storage mechanism;
- transmitting an item representing said created token mapping to said server-side collection service; and
- tokenizing one or more other instrumentation items in said client-side offline storage mechanism based on the token mapping.

22. The one or more non-transitory computer readable media of claim 13, the step of transmitting further comprising:
- detecting a delivery confirmation message from said server-side collection service indicating receipt of said instrumentation item; and
- based upon detecting said delivery confirmation message, removing said instrumentation item from said client-side offline storage mechanism.

23. The one or more non-transitory computer readable media of claim 13, further comprising instructions for:
- detecting that a delivery confirmation message from said server-side collection service indicating receipt of said instrumentation item has not been received after a specified period of time;
- based upon detecting that said delivery confirmation message has not been received after a specified period of time, retransmitting said instrumentation item to said server-side collection service.

24. The one or more non-transitory computer readable media of claim 13, wherein said client-side offline storage mechanism is a persistent component of a web browser.

25. The method of claim 1, further comprising determining not to attempt to transmit said instrumentation item during the first online session in response to determining that transmission criteria is not satisfied during the first online session.

26. The method of claim 1, further comprising:
- during the first online session between the remote service and the client, detecting a second interaction by the user with the interface that is displayed on the client;
- in response to detecting said second user interaction, storing a second instrumentation item representing said second user interaction in the client-side offline storage mechanism; and
- during the first online session between the remote service and the client, transmitting said second instrumentation item from said client-side offline storage mechanism to the server-side collection service.

27. The one or more non-transitory computer readable media of claim 13, further comprising instructions for determining not to attempt to transmit said instrumentation item during the first online session in response to determining that transmission criteria is not satisfied during the first online session.

28. The one or more non-transitory computer readable media of claim 13, further comprising instructions for:
- during the first online session between the remote service and the client, detecting a second interaction by the user with the interface that is displayed on the client;
- in response to detecting said second user interaction, storing a second instrumentation item representing said second user interaction in the client-side offline storage mechanism; and
- during the first online session between the remote service and the client, transmitting said second instrumentation item from said client-side offline storage mechanism to the server-side collection service.

* * * * *